(12) United States Patent
De Mul

(10) Patent No.: US 8,469,599 B2
(45) Date of Patent: Jun. 25, 2013

(54) ROLLING BEARING

(75) Inventor: Jan De Mul, Aurachtal (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 765 days.

(21) Appl. No.: 12/158,438

(22) PCT Filed: Dec. 8, 2006

(86) PCT No.: PCT/DE2006/002184
§ 371 (c)(1),
(2), (4) Date: Jul. 24, 2008

(87) PCT Pub. No.: WO2007/071228
PCT Pub. Date: Jun. 28, 2007

(65) Prior Publication Data
US 2009/0003747 A1 Jan. 1, 2009

(30) Foreign Application Priority Data
Dec. 21, 2005 (DE) .......................... 10 2005 061 102

(51) Int. Cl.
*F16C 33/34* (2006.01)

(52) U.S. Cl.
USPC ............ 384/565; 384/564; 384/619; 384/622

(58) Field of Classification Search
USPC ................. 384/513, 548, 564, 565, 568, 618, 384/619, 622
See application file for complete search history.

(56) References Cited

U.S. PATENT DOCUMENTS

| | | | | |
|---|---|---|---|---|
| 4,318,574 A | * | 3/1982 | Nakamura | 384/564 |
| 6,530,693 B1 | * | 3/2003 | Ijuin et al. | 384/450 |
| 6,767,134 B2 | * | 7/2004 | Murai et al. | 384/568 |
| 6,997,617 B2 | * | 2/2006 | Ide et al. | 384/450 |
| 7,048,445 B2 | * | 5/2006 | Torisawa | 384/450 |
| 2004/0264825 A1 | * | 12/2004 | Kamamura et al. | 384/568 |

FOREIGN PATENT DOCUMENTS

| | | |
|---|---|---|
| DE | 102 30 357 | 3/2003 |
| DE | 10 2004 006313 | 9/2004 |
| EP | 1 482 191 | 12/2004 |
| JP | 04 331813 | 11/1992 |
| JP | 2001065574 A | 3/2001 |
| JP | 2003120687 A | 4/2003 |
| JP | 2003206930 A | 7/2003 |
| JP | 2005337420 A | 12/2005 |

\* cited by examiner

*Primary Examiner* — James Pilkington
(74) *Attorney, Agent, or Firm* — Lucas & Mercanti, LLP

(57) ABSTRACT

A rolling bearing which has at least one bearing ring and a plurality of rollers. The bearing ring has a raceway for the rollers and at least one lateral rim for axially guiding the rollers. The roller has a front face facing the rim and the rim has a rim bearing surface facing the roller. At least sections of at least the front face or the rim bearing surface are cambered in the direction of the rim bearing surface or the front face. The camber has a logarithmic profile of camber in at least one border section.

11 Claims, 1 Drawing Sheet

ROLLING BEARING

CROSS-REFERENCE TO RELATED APPLICATIONS

This application is a 371 of PCT/DE2006/002185 filed Aug. 12, 2006, which in turn claims the priority of DE 10 2005 061 103.6 filed Dec. 21, 2005. The priority of both applications is hereby claimed and both applications are incorporated by reference herein.

FIELD OF THE INVENTION

The invention relates to a rolling bearing. The present invention is described with reference to tapered roller bearings, although it is pointed out that the invention may also be applied to other types of bearing, such as cylindrical roller bearings or self aligning ball bearings.

BACKGROUND OF THE INVENTION

According to the state of the art roller bearings are known which, with reference to a raceway, have lateral rims for absorbing axial stress components. In this connection, according to the state of the art, cylindrical roller bearings with flat roller front faces and flat rim faces are known. These bearings give rise to edge loading of the rolling body with respect to the rim. The result of such edge loading is a reduced working life of the rolling bearing.

In addition, according to the state of the art, cylindrical roller bearings are known where the front face of the rolling bodies is formed in the manner of a spherical cap. In the case of these rolling bodies a central region of the front faces is not spherical, but is formed flat or with a depression. Thus the contact surface of these rolling bodies is at least on the rim shoulder to a certain degree truncated, resulting in a limited axial load capacity during rim contact.

SUMMARY OF THE INVENTION

The present invention relates a rolling bearing, which is able to withstand higher axial stresses compared to the state of the art. A special area of application of such tapered or cylindrical roller bearings is for example wind power gearing.

The rolling bearing according to the invention has at least one bearing ring and a plurality of rolling bodies. The bearing ring has a raceway for the rolling bodies and at least one lateral rim for axially guiding the rolling bodies. According to the invention, the rolling body has a front face with no edge facing the rim and the rim has a rim bearing surface facing the rolling body and at least the front face or the rim bearing surface is, at least along sections, curved in a convex manner in the direction of the rim bearing surface or the front face. This curvature has a logarithmic curvature profile in at least one edge section.

The bearing ring may consist of a bearing outer ring or a bearing inner ring. The front face of the rolling body is understood as being the end face thereof as opposed to the lateral surface, the rolling body rolling with its lateral surface along the raceway of the bearing ring.

As well as providing guidance, the lateral rim also serves to absorb axial loading components.

With respect to the rolling bodies, an edge section is understood to mean any section of the front face which is spaced apart in its entirety from the rotational axis or axis of symmetry of the rolling body. An edge section of the rim bearing surface is correspondingly understood to mean any section which is spaced apart in its entirety from the axis of symmetry of the rolling bearing. A logarithmic relationship or a logarithmic curvature profile is understood to mean any relationship which has at least one logarithmic component and in particular a logarithmic factor or summand. The front face preferably usually has a first curvature profile in at least one first edge section and a second curvature profile, which differs from the first, in a second edge section.

A first and a second curvature profile are understood to mean two different curvatures, that is to say curvatures which can be described by different geometric relationships. Here, however, a curvature is understood to mean only a curvature with a finite radius of curvature; a straight line is therefore not considered as a curvature.

For example, a first edge section which is situated closer to the rotational axis of the rolling body could have a first radius of curvature, and a second edge section which is situated further outward could have a second logarithmic curvature profile. In a preferred embodiment which is described in detail below, the first edge section has a toroidal convex curvature profile, and the second edge section has a logarithmic curvature profile.

The front face is preferably curved in a convex manner in the direction of the rim bearing surface at least in sections. Said curvature preferably has a first curvature profile in the first edge section and has the second curvature profile, which differs from the first, in the second edge section. This means that preferably both curvature profiles are curved in a convex manner in the direction of the rim bearing surface. It would however also be possible to provide only one logarithmic curvature profile of the front face.

Preferably the rolling bearing has a second bearing ring and the rolling bodies are arranged between the first and the second bearing rings. A lateral rim is preferably also arranged in the case of the second bearing ring and especially preferably on the side of the rolling bearing lying opposite the first rim.

The curvature preferably extends toroidally in at least one edge section. Whereas, in the spherical cap like curvature known according to the state of the art the entire front face of the rolling body has, along sections, the form of a sphere, the radius of this sphere lying on the axis of rotation of the rolling body, the toroidal curvature of the front face described here is not described by a sphere, the center of which lies on the axis of rotation of the rolling body, but for example by circular lines or ellipse lines, the centers of which are offset from the axis of rotation. More precisely, in a preferred embodiment, the centers of the toroidal curvatures are arranged in the manner of a circle around the axis of rotation of the rolling body.

In this connection these centers need not necessarily be the centers of circles, but they may also be centers of ellipses or similarly formed bodies. As a result of the toroidal curvature a circular curvature is present in the outer region of the rolling body and this curvature merges in an edgeless manner into a flat central region of the rolling bearing. Thus, viewing the rolling body in axial section, a flat central region adjoins an outer region with a given radius of curvature and a second curved region with the given radius of curvature adjoins this flat central region. The respective circular curvatures are preferably adjoined by the logarithmic curvature profile according to the invention.

In a further preferred embodiment, the curvature profile in at least one region of the front face can be described by a superposition of a toroidal relationship and of a logarithmic relationship. This makes it possible, for example, for a logarithmic curvature profile to be superposed on a toroidal curvature profile. It is however also possible for a toroidal profile and a logarithmic profile to be applied separately from one another and to merge into one another at a predefined transition point.

The curvature profile in at least one edge section is preferably described by the mathematical relationship $$h(x) = cD_w \ln\left(\frac{1}{1 - k\left(\frac{x}{l}\right)^p}\right).$$

Here, Dw denotes the diameter of the rolling body, l denotes the distance between a contact point between the front face and the rim bearing surface on the one hand and the raceway of the bearing ring or the end point of the front face on the other hand, and h(x) denotes the profile height, that is to say the distance by which the front face is remote from a tangent to the front face at the contact point in the direction of the raceway. With respect to the rim bearing surface, l denotes the spacing between the contact point and the rim shoulder.

Here, it is preferable for the numerical value for c to be between 0.00001 and 1, for the numerical value for k to be between 0.5 and 2.5, and for the numerical value for p to be between 1 and 10. In practical application, it must however be ensured that the denominator is always greater than 0.

Preferably the aperture angle between the raceway and the rim bearing surface is greater than 90°. In the case of evenly curved surfaces, in order to determine the rim aperture angle, a straight line is considered, said line running in the radial direction of the rolling bearing through the starting point and the end point of the curvature. As a result of this embodiment, instead of a contact area between the front face of the rolling bearing and the rim bearing surface, there is a contact point with a gap gradually opening outwards. In this way a frictionally favorable contact is established, resulting in favorable penetration of lubricant and thus a smaller amount of friction.

In addition, as a result of the inventive constructional form of the rim bearing surface and the front face of the rolling body, an effectively round geometry is obtained in the region of contact and thus a high tolerance with respect to tilting or skewing of the roller is achieved.

In a further preferred embodiment both the front face and the rim bearing surface are curved at least along sections. Particularly preferably both the rim bearing surface and the front face of the rolling body have a crowned form with a given toroidal radius. In this connection this toroidal radius of the two curvatures may be the same, although the two radii may also vary with respect to each other. The curvature of the rim bearing surface can also have a logarithmic curvature profile in one section.

Preferably both the front face and the rim bearing surface are curved in a convex manner in the direction of the respective other surface or face. In this way particularly favorable penetration of lubricant may be achieved. It is also possible, however, for one of the two surfaces to be curved in a concave manner, in which case the corresponding convex radius of curvature is particularly preferably smaller than the concave radius of curvature.

Preferably the front face of the rolling body lies at least at a distance on a circular line. This means that, as mentioned above, the curvatures of the rolling body, in axial section, are formed by circular lines, the centers of these circular lines being situated offset at a given distance from the axis of rotation of the rolling body preferably in the direction of the curvature.

Preferably at least one component of the rolling bearing according to the invention is produced by means of a hard turning process. By using the hard turning process it is possible to achieve low-cost production of the torus radii mentioned.

Preferably the rolling bearing is chosen from a group of rolling bearings which includes cylindrical roller bearings, tapered roller bearings, self aligning ball bearings, radial bearings, axial bearings and the like.

In a further preferred embodiment the radius of curvature at least of the rim bearing surface or the front face, according to the amount, is at least three times as great as the diameter of the rolling body. Through this selection of the radius of curvature it is possible to achieve a particularly efficient contact between the front face and the rim bearing surface. The radius of curvature of one of the two surfaces may, however, also be infinite, i.e. in this case the curvature may be represented by a straight line.

Stated more precisely, if the radius of curvature in the case of one of the two surfaces becomes infinite, in axial section a straight line is obtained instead of a spherical formation. This straight line is again the generatrix of a cone of the rim bearing surface or the front face of the rolling body, depending on whether the straight line is turned about the axis of symmetry of the rolling body or about the axis of symmetry of the rolling bearing in its entirety.

It is however also possible to envisage a plane instead of a conical surface if the rim bearing surface is perpendicular to the bearing axis.

In a preferred embodiment the curvatures of the rim bearing surface and the front face are formed such that substantially only one contact point occurs between the rim bearing surface and the front face. In this connection particularly preferably this contact point in the radial direction of the rolling body is situated at least at the same distance from the axis of symmetry of the rolling body as the center of the circular line which describes the curvature of the front face.

In general this means that preferably the center of the circular lines for different rolling bodies according to the invention are arranged on a torus center line which extends parallel with respect to the axis of symmetry of the rolling body. With respect to this torus center line the contact point lies, in the radial direction of the rolling body, outside thereof. This means that the touching or contact line is inclined at a given angle with respect to the torus center line. This angle of inclination lies between 0° and 30° and preferably between 0° and 10°.

BRIEF DESCRIPTION OF THE DRAWINGS

Further advantages and embodiments will become clear from the accompanying drawings.

In these drawings.

DETAILED DESCRIPTION OF THE INVENTION

Figure 1:
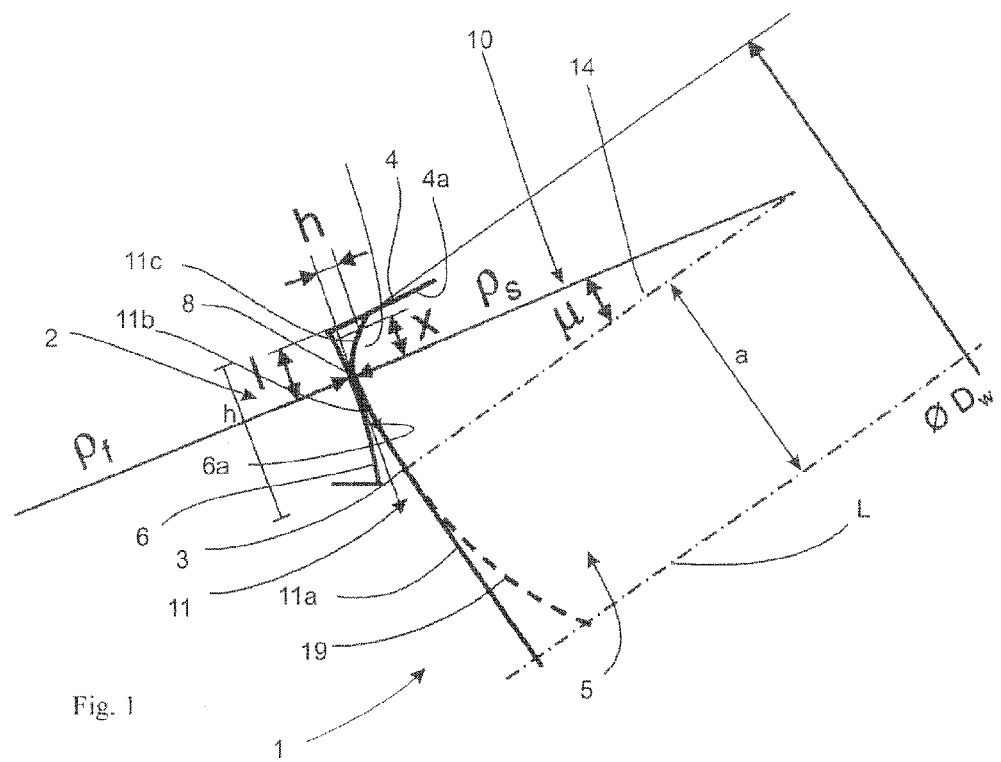
FIG. 1 is a partial view illustrating the basic geometrical layout of the rolling bearing.
Figure 2:
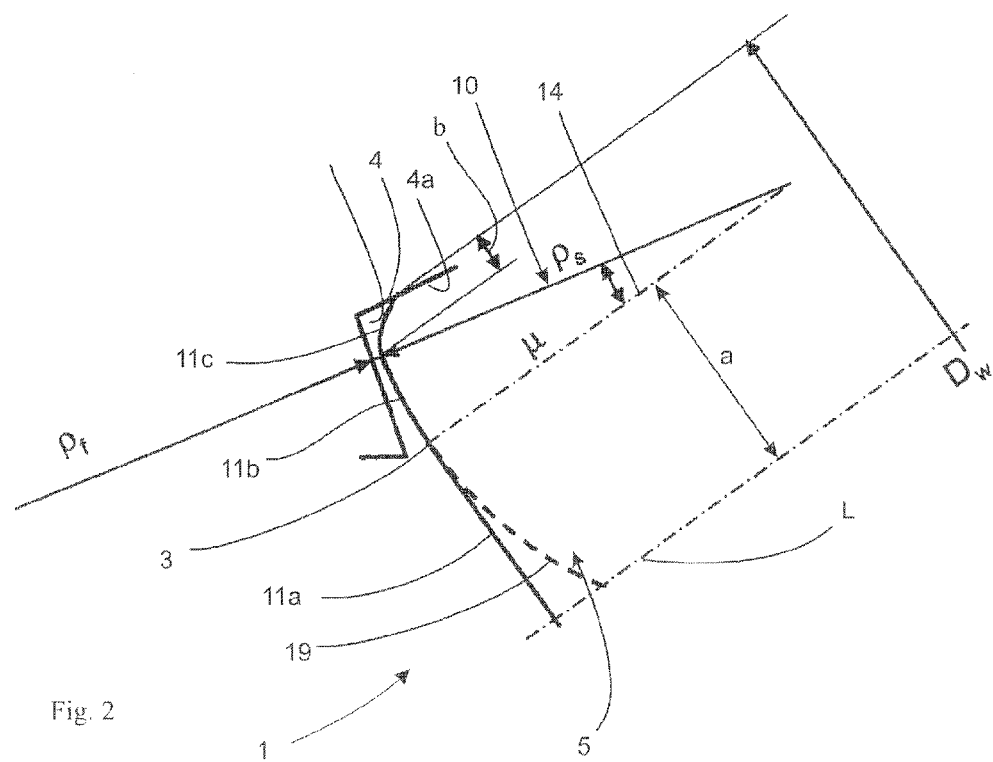
FIG. 2 is a further partial illustration of the rolling bearing according to the invention.

FIG. 1 shows a schematic sectional representation of a rolling bearing 1 according to the invention, illustrating the geometrical layout thereof. In this connection the reference number 5 refers to a rolling body for a tapered roller bearing, although only a part of the front face 11 of this rolling body is shown.

This front face 11 of the rolling body 5 has a central section 11a as well as a first edge region 11b and a second edge region 11c. In this embodiment the central section 11a extends substantially in the form of a straight line and the first and the second edge regions 11b, 11c are each curved. The reference number 6 refers to a lateral rim of a bearing ring which has a rim bearing surface 6a which faces the front face 11 of the rolling body 5.

In the embodiment shown in FIG. 1 the central section 11a of the front face 11 does not make contact against the rim bearing surface 6a of the rim 6. Therefore the central region 11a of the front face 11, instead of extending in the form of a straight line, may also extend in substantially any other preferred manner, having, for example, a depression in the center.

The reference letter L refers to the axis of symmetry of the rolling body 5. As mentioned in the introduction, the first edge section 11b of the front face 11 of the rolling body 5 is curved toroidally. In the embodiment shown in FIG. 1 the edge section 11b of the front face 11, in axial section, is curved substantially in the manner of a circle and has a radius of curvature $\rho_s$. Thus the edge section 11b in the embodiment shown in FIG. 1 is curved in a convex manner in the direction of the rim bearing surface 6a.

The rim 6 or the rim bearing surface 6a of the rim 6 is also curved toroidally, this curvature having a radius of curvature $\rho_f$. The reference number 19 refers to a circular line on which the edge section 11b of the front face 11 lies. The center of this circular line lies on the torus center line 14. The distance between the raceway 4a in the region of the front face 11 and the torus center line 14 corresponds approximately to the height h of the rim.

This torus center line 14 is situated at the distance a from the axis of symmetry L of the rolling body. The rolling body shown in FIG. 1 has the geometrical configuration shown in FIG. 1 in any random axially sectioned view. This means that the circular line 19 must also be turned about the axis of symmetry L in order to describe the front face 11 in its totality. In a transition zone or at a transition point 3 the first edge section 11b curved in the manner of a circle and the central region 11a extending in the manner of a straight line merge with each other. Since the center of the circular curvature lies on the torus center line 14, a tangent to the circular line 19 would extend at the point 3 precisely on the central section 11a. Thus no edge is present on the front face 11.

The circle radii $\rho_f$ and $\rho_s$ are preferably in each case at least as great as three times the diameter Dw of the rolling body. The arrows indicating the radii $\rho_f$ and $\rho_s$ define at the same time the contact line 10 which extends through the contact point 8. This contact line 10 is inclined at an angle µ relative to the direction of the torus center line 14 and thus also the direction of the axis of symmetry L. By selecting this inclination the position of the contact point on the front face can be substantially freely chosen. Preferably, however, the contact point 8 lies at approximately half the height of the rim 6.

The reference number 4 distinguishes a central region of the bearing ring with the raceway 4a (not shown in greater detail) for the rolling body.

As mentioned in the introduction, the second edge section 11c is described by a logarithmic profile and follows the mathematical relationship likewise mentioned in the introduction.

Here, in FIG. 1, the reference letter x relates to the variable, with x having the value 0 at the contact point 8 between the rim bearing surface 6a and the front face 11, and with it therefore also being true that h(x)=0 in this region, which means that the logarithmic component does not yet carry any weight here, and therefore the contact point still lies on the circular first edge section 11b. The circular curvature profile and the logarithmic curvature profile therefore merge into one another at the contact point 8.

The closer x becomes to the value l, the greater the value assumed by the factor x/c. The value of $k \cdot (x/l)^p$ therefore also becomes greater, resulting in the steep profile of the second edge section 11c in the vicinity of the raceway 4a. Here, l denotes the distance between the contact point 8 and the raceway 4a in a direction which is tangential with respect to the front face 11 at the contact point 8.

Said logarithmic end profiling generates a contact which is largely free from edge stress peaks between the rim bearing surface 6a and the front face 11, and which can therefore be more highly loaded.

It is however also possible for 2 circular curvatures to be provided, with the first edge section 11b having the profile shown in FIG. 1 and with the second edge section having a circular profile with a smaller radius of curvature. The applicant reserves to aim divisional applications at such a profile of the front face.

Also conceivable would be other profiles which lead to a comparatively steep profile of the front face in the direction of the edge or the lateral surface of the rolling body.

A gap which is open to the outside at both sides proceeding from the center of contact is generated between the rim bearing surface 6a and the front face of the rolling body.

All the features disclosed in the application documents are claimed as essential for the invention in so far as they are novel individually or in combination with respect to the state of the art.

| | List of reference numbers/letters |
|---|---|
| 1 | Rolling bearing |
| 2 | Bearing ring |
| 3 | Transition zone |
| 4 | Central region of bearing ring 2 |
| 4a | Raceway |
| 5 | Rolling body |
| 6 | Lateral rim |
| 6a | Rim bearing surface |
| 8 | Contact point |
| 10 | Contact line |
| 11 | Front face |
| 11a | Central section of front face 11 |
| 11b | First edge section of front face 11 |
| 11c | Second edge section of front face 11 |
| 14 | Torus center line |
| 19 | Circular line |
| L | Axis of symmetry of rolling body |
| $\rho_s, \rho_f$ | Radius of curvature |
| a | Distance between axis of symmetry of rolling body 5 and torus center line 14 |
| h | Rim height |
| b | Radial distance between contact point 8 and end of front face 11 |
| Dw | Diameter of rolling body |
| µ | Angle between axis of symmetry and contact line 10 |
| x | Variable |
| h(x) | Profile height |
| I | Distance between contact point 8 and raceway 4a |
| α | Rim aperture angle |

What is claimed is:

1. A rolling bearing, comprising:
   at least one bearing ring; and
   a plurality of rolling bodies, the bearing ring having a raceway for the rolling bodies, and at least one lateral rim for axially guiding the rolling bodies, wherein the rolling body has a lateral surface and a front face with at least one edge section, the lateral surface configured to roll along the raceway of the at least one bearing ring and the front face being an end face of the rolling body, the front face meeting the lateral surface at the raceway, wherein the at least one lateral rim has a rim bearing surface facing the front face of the rolling body, the front face, at least along sections, is convexly curved as viewed in a direction from the rim bearing surface toward the rolling body, and the rim bearing surface is continuously convexly curved in a direction of the front face, the at least one edge section of the front face having a logarithmic curvature profile, the rim bearing surface and the front face both having a radius of curvature which are each formed in a manner so that substantially only one contact point occurs between the rim bearing surface and the front face, and the front face has a curvature that extends toroidally in the at least one edge section whereby the front face transmits axial force at the contact point.

2. The rolling bearing as claimed in claim 1, wherein the front face has a first edge section and a second edge section, with the curvature profile in the first edge section differing from the curvature profile in the second edge section.

3. The rolling bearing as claimed in claim 1, wherein the front face, which has a first edge section and a second edge section, is curved in a convex manner in the direction of the rim bearing surface at least in sections, with said curvature having a first curvature profile in the first edge section and having a second curvature profile, which differs from the first curvature profile, in the second edge section.

4. The rolling bearing as claimed in claim 1, wherein the curvature profile in at least one region of the front face can be described by a superposition of a toroidal relationship and of a logarithmic relationship.

5. The rolling bearing as claimed in claim 1, wherein the logarithmic curvature profile in the at least one edge section is described by the mathematical relationship $$h(x) = cDw \ln\left(\frac{1}{1 - k\left(\frac{x}{l}\right)^p}\right)$$

where Dw is the diameter of the rolling body, l is the distance between the contact point and the raceway, and h(x) is the profile height of the front face of the rolling body, the numerical value for c is between 0.00001 and 1, the numerical value for k is between 0.5 and 2.5, and the numerical value for p is between 1 and 10.

6. The rolling bearing as claimed in claim 1, wherein an aperture angle between the raceway and the rim bearing surface is greater than 90°.

7. The rolling bearing as claimed in claim 1, wherein the front face of the rolling body lies, at least along sections, on a circular line.

8. The rolling bearing as claimed in claim 7, wherein the circular line has a geometric center which is offset with respect to an axis of symmetry of the rolling body in the direction of the curvature.

9. The roiling bearing as claimed in claim 7, wherein the contact point in the radial direction of the roiling body is situated at least at the same distance from an axis of symmetry of the rolling body as the center of a circular line.

10. The rolling bearing as claimed in claim 1, wherein the rolling bearing is chosen from a group of rolling bearings which includes cylindrical roller bearings, tapered roller bearings, self-aligning ball bearings, radial bearings, and axial bearings.

11. The rolling bearing as claimed in claim 1, wherein at least one of the rim bearing surface or the front face has a radius of curvature which is at least three times as great as the diameter of the rolling body.

* * * * *